United States Patent [19]

Koide

[11] Patent Number: 4,667,981
[45] Date of Patent: May 26, 1987

[54] WEBBING LOCK APPARATUS
[75] Inventor: Teruhiko Koide, Niwa, Japan
[73] Assignee: Kabushiki Kaisha Tokai-rika-denki-seisakusho, Aichi, Japan
[21] Appl. No.: 708,525
[22] Filed: Mar. 5, 1985
[30] Foreign Application Priority Data Mar. 7, 1984 [JP] Japan .............................. 59-32869[U]

[51] Int. Cl.$^4$ .............................................. B60R 21/10
[52] U.S. Cl. ................................. 280/806; 242/107.2
[58] Field of Search ....................... 280/806, 801, 808; 242/107.2, 107.4 A

[56] References Cited
U.S. PATENT DOCUMENTS

| | | | |
|---|---|---|---|
| 4,116,402 | 9/1978 | Nomura et al. | 280/806 |
| 4,262,932 | 4/1981 | Motonami et al. | 280/806 |
| 4,283,076 | 8/1981 | Matsunami et al. | 280/806 |
| 4,300,731 | 11/1981 | Kondziola | 280/806 |
| 4,570,975 | 2/1986 | Kawaguchi | 280/806 |

Primary Examiner—Richard A. Bertsch
Attorney, Agent, or Firm—Sixbey, Friedman & Leedom

[57] ABSTRACT

A webbing lock apparatus includes a fixed lock member and a movable lock member which is disposed such as to face the fixed lock member. The movable lock member is moved while being guided by a guide in a direction diagonally crossing the webbing wind-off direction so that a webbing is clamped between the same and the fixed lock member. A high degree of acceleration at the time of a vehicular emergency which is detected by an acceleration sensing means is transmitted to the movable lock member through a movable arm, whereby the webbing is clamped between the fixed and movable lock members. It is, accordingly, possible to effect a reliable webbing lock operation by the use of a small-sized acceleration sensing means.

19 Claims, 6 Drawing Figures

WEBBING LOCK APPARATUS

BACKGROUND OF THE INVENTION

1. Field of the Invention:

The present invention relates to a webbing lock apparatus for use in a seatbelt system designed to restrain an occupant of a vehicle when an emergency situation occurs, the apparatus being employed to clamp an intermediate portion of an occupant restraining webbing so that the webbing is locked in position. More particularly, the invention pertains to a webbing lock apparatus which is suitably incorporated in a webbing retractor disposed on the ceiling of a vehicle.

2. Description of the Prior Art:

A typical webbing retractor is arranged such that one end of an occupant restraining webbing is secured to a webbing takeup shaft, which is rotated by the biasing force of a spiral spring in such a manner as to wind up the entire or a predetermined length of the webbing. In general, the webbing retractor is secured to a side wall of the vehicle body, and the webbing portion which is wound off from the webbing takeup shaft is turned about at a slip joint so as to be used as a shoulder webbing.

This type of seatbelt system, however, suffers the following problem. Since the webbing is turned about at the slip joint with an acute angle, a disadvantageously large frictional resistence occurs between the webbing and the slip joint when the webbing is moved.

In order to overcome such a problem, a system has heretofore been developed in which the webbing retractor is installed on the ceiling of the vehicle or on its center pillar, and the webbing is wound off through an opening formed in a panel. With this system, although the course of the webbing is slightly changed at the panel opening, the turnabout angle of the webbing is not acute and, therefore, the frictional resistance occurring between the webbing and the opening is favorably reduced.

On the other hand, the webbing retractor generally incorporates a webbing lock apparatus which is designed to prevent the webbing from being wound off when a vehicular emergency occurs.

In U.S. patent application Ser. No. 686,395, for example, a webbing lock apparatus suitable for the webbing retractor mounted on the ceiling of the vehicle is shown, in which the webbing is clamped by a fixed lock member and a movable lock member when a vehicular emergency occurs. In the webbing lock apparatus, an acceleration sensor of a relatively large size is used since the webbing itself is pushed up by the inertial force of the acceleration sensor. Also, it has been expected to reduce a projection amount of the webbing lock apparatus from the ceiling of the vehicle.

SUMMARY OF THE INVENTION

In view of the above-described facts, a primary object of the present invention is to provide a webbing lock apparatus capable of reliably clamping the webbing and directly using an acceleration sensing meas of smaller size than a conventional one.

Another object of the present invention is to provide a webbing lock apparatus capable of being disposed on the ceiling of the vehicle with less projection amount therefrom.

To this end, according to the invention, there is provided a webbing lock apparatus comprising: a guide adapted for guiding a movable lock member in two directions, that is, a webbing wind-off direction and a direction in which the movable lock member comes closer to a fixed lock member; a guide roller rotatably supported by a frame and over which a webbing is passed; a gear secured to the guide roller; an arm having one of its ends disposed in such a manner as to be engageable with the gear and the other end retained by a portion of the movable lock member, the arm being supported in such a manner as to be movable in the webbing wind-off direction; and acceleration sensing means for sensing a high degree of acceleration at the time of a vehicular emergency and causing the arm to engage with the gear when sensing a high degree of acceleration.

By virtue of the above-described arrangement, a force acting to wind off the webbing causes the movable lock member to move in the webbing wind-off direction through the arm, whereby the webbing clamping force of the movable member is increased by a so-called wedge action. Further, since the arm is moved by a force of a favorably small magnitude, it is advantageously possible to employ a small pendulum-type acceleration sensing means.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PREFERRED EMBODIMENT

Figure 1:
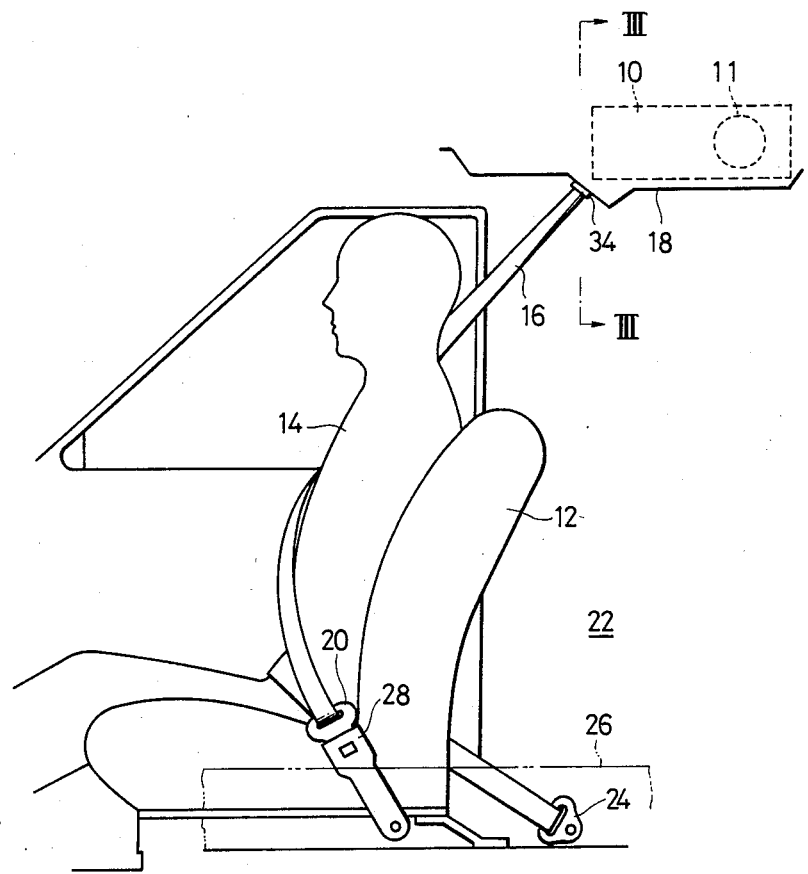
FIG. 1 is a side elevational view of a seatbelt system to which the webbing lock apparatus according to the present invention is applied, which shows how an occupant is secured by an occupant restraining webbing.

FIG. 1 is a side elevational view of a seatbelt system to which a webbing lock apparatus 10 according to the present invention is applied.

This seatbelt system is arranged such that an occupant 14 seating himself in a seat 12 is brought into a three-point webbing fastened condition by means of a webbing 16. The webbing 16 is wound up from one end thereof into a webbing retractor 11 which is installed inside a roof-side inner panel 18. The other end portion of the webbing 16 is passed through a tongue plate 20 such as to be turned about and is then connected to an anchor plate 24 which is provided on the lower portion of a side wall 22 of the vehicle body.

The tongue plate 20 is engageable with a buckle device 28 which projects upwardly from a tunnel portion 26 in the approximate center of the vehicle. With this arrangement, after the occupant 14 has seated himself in the seat 12, he engages the tongue plate 20 with the buckle device 28. Thereupon, the occupant 14 is secured by a lap webbing which is constituted by the webbing portion between the tongue plate 20 and the anchor plate 24 and a shoulder webbing which is constituted by the webbing portion between the tongue plate 20 and the webbing retractor 11.

Figure 2:
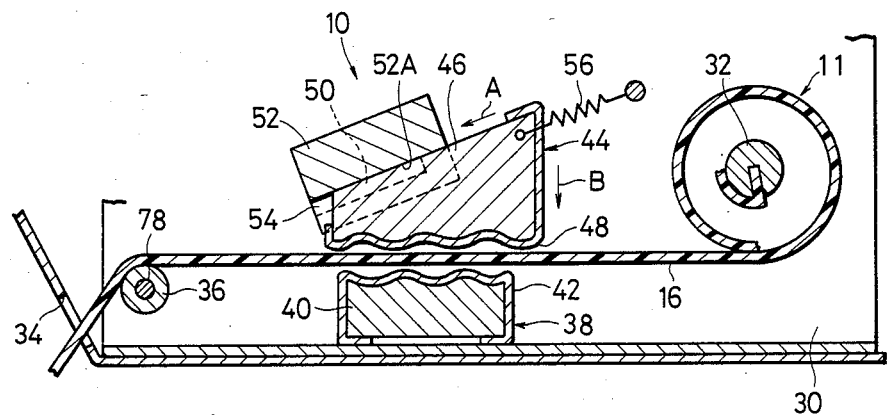
FIG. 2 is a vertical sectional view of the webbing lock apparatus according to the present invention.

The webbing retractor 11 is, as shown in FIG. 2, installed between the roof-side inner panel 18 and a roof-side outer panel (not shown). In the retractor 11, one end of the webbing 16 is retained by a webbing takeup shaft 32 which is rotatably supported by a frame 30, and the webbing 16 is wound up in layers on the webbing takeup shaft 32 by the biasing force of a spiral spring (not shown).

Figure 3:
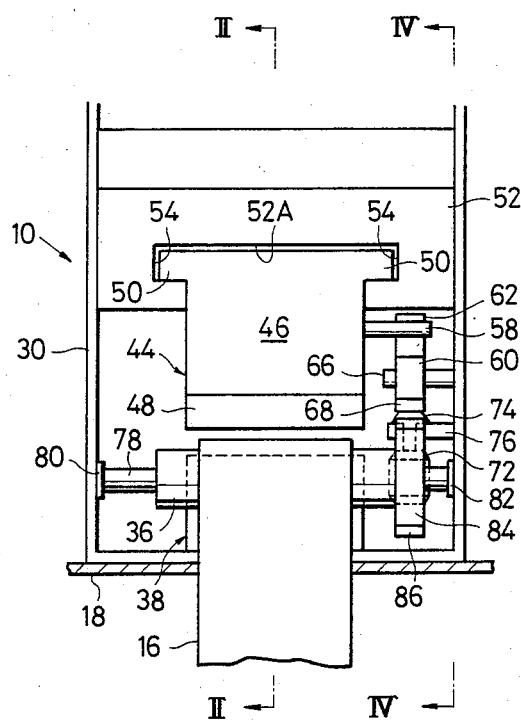
FIG. 3 is a sectional view taken along the line III—III of FIG. 1.

The webbing 16 wound off from the webbing retractor 11 has its course changed, as will be understood from FIG. 3, by a guide roller 36 which is rotatably supported by the frame 30 and is passed through an opening 34 formed in the roof-side inner panel 18 such as to extend into the compartment space.

The webbing lock apparatus 10 arranged in accordance with this embodiment is disposed between the webbing retractor 11 and the opening 34. The webbing lock apparatus 10 includes a fixed lock member 38 secured to the lower portion of the frame 30 which is in turn secured to the ceiling of the vehicle. The fixed lock member 38 consists of a core 40 of a substantially rectangular cross-section and a lock plate 42 with a corrugated portion which covers the core 40. The lock plate 42 is disposed in close proximity to the webbing 16.

Further, a movable lock member 44 is disposed across the webbing 16 in such a manner as to face the fixed lock member 38. The movable lock member 44 consists of a core 46 of a substantially triangular cross-section and a lock plate 48 with a corrugated portion which covers the core 46. The corrugated portion of the lock plate 48 faces the webbing 16. The core 46 is provided with projections 50 which respectively project from its sides in the manner shown in FIG. 3. The projections 50 are respectively received in elongated grooves 54 which are formed in a guide 52.

The guide 52 is secured to the upper portion of the frame 30. The guide 52 supports the movable lock member 44 by the elongated grooves 54 and a slanted surface 52A which is slanted with respect to the webbing 16 as well as guiding the movable lock member 44 in the direction of the arrow A in FIG. 2. A tension coil spring 56 is connected to one end portion of the movable lock member 44 such that the movable lock member 44 is biased in an obliquely rearward direction. When the movable lock member 44 is in a state such as that shown in FIG. 2, the projections 50 of the movable lock member 44 abut against the respective rear ends of the elongated grooves 54 and, therefore, the rearward movement of the movable lock member 44 is limited at this position.

Figure 4:
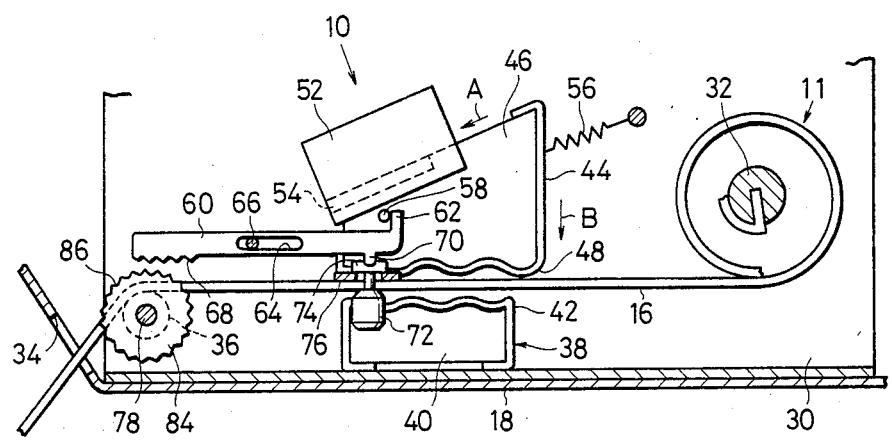
FIG. 4 is a sectional view taken along the line IV—IV' of FIG. 3.

Moreover, as shown in FIGS. 3 and 4, a pin 58 projects from one side of the movable lock member 44 in such a manner as to retain a bent rear end portion 62 of an arm 60. The arm 60 has a continuous length and extends substantially in parallel to the longitudinal axis of the webbing 16. The arm 60 has a slot 64 formed in its intermediate portion. A pin 66 is received in the slot 64, whereby the arm 60 is pivotal about the pin 66 as well as being movable in its longitudinal direction through the pin 66. Moreover, the arm 60 has teeth 68 which are formed on the lower surface of its front end and further has a projection 70 which projects from the lower surface of its rear end in such a manner that the projection 70 abuts against the upper surface of the head portion 74 of an inertia weight 72 which serves as an acceleration sensing means.

The inertia weight 72 has its head portion 74 placed on the surface of a support plate 76 which is provided on the inner surface of the frame 30. Thus, when a vehicular emergency occurs, the inertia weight 72 acts to push up the projection 70, thus causing the arm 60 to pivot counterclockwise as viewed in FIG. 4.

On the other hand, the guide roller 36 is, as will be clear from FIG. 3, integrally secured to a shaft 78 which has both its ends rotatably supported by the frame 30 through respective bearings 80, 82. A gear 84 is secured to the portion of the guide roller 36 on the side thereof which is closer to the bearing 82 in such a manner that teeth 86 of the gear 84 correspond to the teeth 68 of the arm 60.

Accordingly, as the arm 60 pivots counterclockwise by the swing of the inertia weight 72, the teeth 68 engage with the teeth 86 of the gear 84. When a vehicular emergency occurs, the webbing 16 is rapidly wound off and consequently both the guide roller 36 and the gear 84 are rotated counterclockwise and, therefore, the arm 60 is moved toward the front end of the vehicle (toward the left-hand side as viewed in FIG. 4). At the same time, the movable lock member 44 also moves along the guide 52 in the directions of the arrows A and B. In consequence, the webbing 16 is clamped between the movable and fixed lock members 44, 38 in the manner shown in FIG. 5.

The arm 60 is heavier at the rear side than the front side thereof when in a state such as that shown in FIG. 4. As the arm 60 forwardly moves along the pin 66, however, the side of the arm 60 which is closer to the teeth 68 becomes heavier than the other side. For this reason, when a vehicular emergency occurs, the teeth 68 reliably engage with the teeth 86. On the other hand, the movable lock member 44 is first moved slightly toward the front end of the vehicle and, when the lock plate 48 comes in contact with the webbing 16, the movable lock member 44 is further moved forwardly by the frictional force produced between the lock plate 48 and the webbing 16 being wound off. In other words, the movable lock member 44 reliably prevents the webbing 16 from being further wound off by means of the wedge action.

The webbing lock apparatus 10 in accordance with this embodiment, arranged as described, operates as follows.

When the webbing 16 is in a maximumly wound-up state, a predetermined length of the webbing 16 is wound up on the webbing takeup shaft 32 by the biasing force of the spring in the webbing retractor 11, and the other webbing portion is located in a tensed state between the opening 34 and the anchor plate 24 as shown in FIG. 1. Further, the movable lock member 44 and the fixed lock member 38 face each other across a predetermined gap.

Under this state, when the occupant 14 pulls the tongue plate 20, the webbing 16 is wound off through the opening 34 of the roof-side inner panel 18. Then, the occupant 14 engages the tongue plate 20 with the buckle device 28, whereby the occupant 14 is brought into a webbing fastened condition in the manner shown in FIG. 1.

In this case, the bending angle of the webbing 16 in the vicinity of the opening 34 is, as will be clear from FIG. 2, favorably gentle by virtue of the existence of the guide roller 36. Therefore, it is advantageously possible to reduce the amount of webbing wind-off force required as compared with that needed in the conventional through-ring or slip joint type mechanism.

When the vehicle runs into an emergency situation, the inertia weight 72 shown in FIG. 4 swings such as to push up the rear end of the arm 60, thus causing the teeth 68 to engage with the teeth 86 of the gear 84. In this case, the gear 84 is being rotated counterclockwise by the webbing wind-off force. The arm 60 is, therefore, moved toward the front end of the vehicle, and the movable lock member 44 is also moved in the directions of the arrows A and B against the pulling force of the tension coil spring 56.

Any slight contact of the lock plate 48 of the movable lock member 44 with the webbing 16 causes the movable lock member 44 to be further moved toward the front end of the vehicle since the wind-off force is acting on the webbing 16. Consequently, the webbing 16 is clamped between the respective corrugated portions of the lock plates 42, 48 in the manner shown in FIG. 5 and is prevented from being further wound off, whereby the occupant 14 is restrained by the webbing 16 and his safety ensured.

Figure 5:
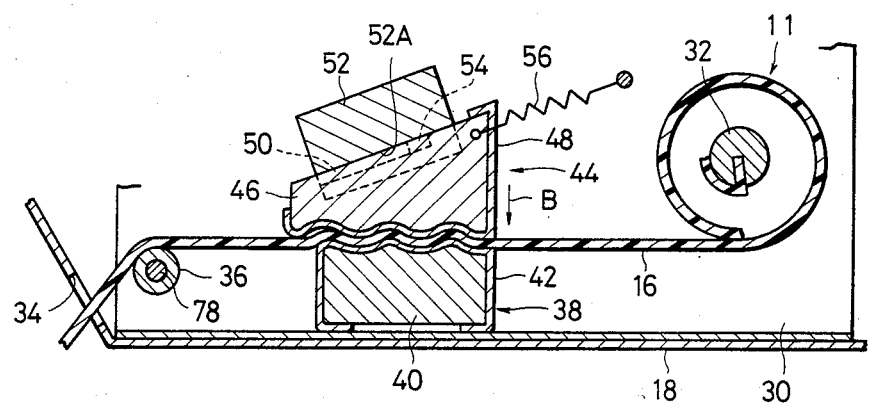
FIG. 5 is a vertical sectional view, similar to FIG. 2, which shows how the occupant restraining webbing is locked.

If a large pulling force further acts on the webbing 16 in a state such as that shown in FIG. 5, this pulling force is converted into a webbing clamping force for the movable lock member 44. There is, therefore, no possibility of any slippage occurring between both the lock plates 42, 48 and the webbing 16 clamped therebetween. More specifically, the movable lock member 44 is moved along the guide 52 in such a manner as to function as a wedge, whereby the webbing 16 is reliably prevented from being further wound off.

When the vehicular emergency situation is over, the wind-off force acting on the webbing 16 decreases or becomes zero, so that both the movable lock member 44 and the arm 60 are pulled rearwardly by the action of the tension coil spring 56. It is preferable to form the teeth 68 of the arm 60 and the teeth 86 of the gear 84 such that it is possible for them to easily disengage from each other when the arm 60 is moved rearwardly. As the arm 60 is moved rearwardly along the pin 66, the portion of the arm 60 on the side thereof which is closer to the rear end 62 becomes heavier than the portion of the arm 60 on the opposite side. In consequence, the projection 70 moves slightly downward and abuts against the upper surface of the head portion 74 of the inertia weight 72, and thus the arm 60 returns to the state shown in FIG. 4. In this case, provision of a guide for supporting the arm 60 allows a more reliable returning action of the arm 60.

When the occupant 14 leaves the vehicle, he disengages the tongue plate 20 from the buckle device 28. Thereupon, he is released from the webbing fastened condition, and the webbing 16 is wound up into the webbing retractor 11 by a predetermined length.

As has been described above, the webbing lock apparatus 10 in accordance with this embodiment allows a webbing clamping operation to be reliably effected when a vehicular emergency occurs. It is, therefore, possible to reduce the undesirably wound-off amount of the webbing 16 when it is locked. Further, since it is only necessary for the arm 60 to act as a so-called trigger means, a relatively small force suffices to push up the arm 60. It is, accordingly, possible to employ the inertia weight 72 which is relatively small. Furthermore, since the vertical movement and the vertical dimension of the movable lock member 44 are small as compared with those of the conventional one, it is advantageously possible to correspondingly reduce the degree of projection of the lock apparatus housing portion into the compartment space.

Figure 6:
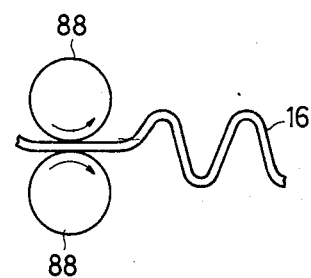
FIG. 6 is a schematic view of another example of a webbing retractor employed in the seatbelt system.

It is to be noted that, in place of the webbing takeup shaft 32 of the webbing retractor 11, a pair of rollers 88 may be employed to linearly draw in the webbing 16 in the manner shown in FIG. 6. In such a case, the space corresponding to the roll diameter of the webbing takeup shaft 32 is conveniently reduced, and it is advantageously possible to further reduce the degree of projection of the roof-side inner panel 18 into the compartment space.

In accordance with the above-described embodiment, the webbing lock apparatus 10 and the webbing retractor 11 are installed on the ceiling of the vehicle. It is, however, quite possible to install them within a center pillar. Further, the webbing lock apparatus 10 in accordance with this embodiment may be incorporated in a conventional webbing retractor provided on the vehicle side wall 22. In addition, such a structure may be employed that the movable lock member 44 and the guide 52 are disposed in the lower portion of the frame 30 so that the movable lock member 44 is returned to its normal state by making use of its own weight without employing the tension coil spring 56.

Furthermore, in place of the inertia weight 72, it is possible to employ other types of acceleration sensing means for sensing a predetermined acceleration in winding-off of the webbing 16 at the time of a vehicular emergency and causing the arm 60 to engage with the gear 84 when sensing such an acceleration.

What is claimed is:
1. A webbing lock apparatus applied to a seatbelt system designed to restrain an occupant of a vehicle when a vehicular emergency occurs, which comprises:
   (a) a frame mounted on the vehicle body;
   (b) a fixed lock member secured to said frame;
   (c) a movable lock member provided such as to face said fixed lock member and to clamp a webbing between the same and said fixed lock member when a vehicular emergency occurs;
   (d) a guide member adapted for guiding said movable lock member in both a webbing wind-off direction and a direction in which said movable lock member comes close to said fixed lock member such that said movable lock member functions as a wedge;
   (e) a guide roller rotatably supported by said frame in such a manner that said webbing is passed over said guide roller;
   (f) a gear secured to said guide roller;
   (g) an arm having a first end that is engageable with said gear and a second end retained by a portion of said movable lock member, said arm being movable in the webbing wind-off direction;
   (h) guide means for guiding the movement of the arm in the webbing wind-off direction, wherein said guide means includes a slot formed in said arm along its longitudinal axis, and a pin projecting from said frame and received in said slot, and
   (i) acceleration sensing means for sensing a high degree of acceleration at the time of a vehicular emer- gency and for causing said arm to engage with said gear when sensing a high degree of acceleration, whereby said webbing is reliably clamped when a vehicular emergency occurs.

2. A webbing lock apparatus according to claim 1, wherein said arm has a toothed portion formed at said first end, said toothed portion being engageable with said gear, whereby said gear and said arm are engaged with each other when said acceleration sensing means senses a high degree of acceleration.

3. A webbing lock apparatus according to claim 2, wherein said second end of said arm is formed in the shape of an L, and the L-shaped portion is retained by a pin projecting from said movable lock member, whereby said movable lock member is moved in a webbing clamping direction in accordance with the movement of said arm when a vehicular emergency occurs.

4. A webbing lock apparatus according to claim 3, wherein said acceleration sensing means is constituted by an inertia weight which includes a head portion for swingably supporting said inertia weight, and said arm has a projection formed in the vicinity of said second end, said projection projecting toward said head portion, whereby, when said inertia weight swings on sensing a high degree of acceleration, said arm is pivoted about said pin on said frame through said projection, so that said arm and said gear are engaged with each other.

5. A webbing lock apparatus according to claim 4, wherein said fixed and movable lock members have corrugated surfaces facing said webbing, whereby said webbing is reliably clamped when a vehicular emergency occurs.

6. A webbing lock apparatus according to claim 5, wherein said movable lock member is biased by biasing means in a direction in which said movable lock member comes away from said fixed lock member, whereby said movable lock member is away from said webbing when said vehicle is in a normal state.

7. A webbing lock apparatus according to claim 6, wherein said guide member is secured to said frame and has an elongated groove for movably receiving a projection formed on said movable lock member, whereby said movable lock member is guided along said elongated groove.

8. A webbing lock apparatus according to claim 7, which is applied to a webbing retractor in a seatbelt system which linearly receives said webbing by the action of a pair of rollers.

9. A webbing lock apparatus applied to a webbing retractor for winding up an occupant restraining webbing, which comprises:
(a) a frame mounted on a vehicle body;
(b) a fixed lock member of a substantially rectangular cross-section secured to said frame;
(c) a movable lock member of a substantially triangular cross-section disposed such as to face said fixed lock member with said webbing interposed therebetween such that, when a vehicular emergency occurs, said webbing is clamped between said movable and fixed lock members;
(d) a guide secured to said frame such as to support and guide said movable lock member in such a manner that the moving direction of said movable lock member and the webbing wind-off direction cross each other so that said movable lock member is capable of acting as a wedge;
(e) a guide roller rotatably supported by a portion of said frame which is forward of said fixed lock member in the webbing wind-off direction in such a manner that said webbing is passed over said guide roller;
(f) a gear wheel secured to said guide roller and rotated with the rotation of said guide roller;
(g) an arm having one end (referred to as a "first end", hereinafter) thereof disposed such as to be engageable with said gear and the other end (referred to as a "second end", hereinafter) retained by a portion of said movable lock member, said arm being supported such as to be movable in the webbing wind-off direction; and
(h) an acceleration sensor for sensing a high degree of acceleration when a vehicular emergency occurs and causing said arm to engage with said gear wheel when sensing a high degree of acceleration, whereby said webbing is reliably clamped when a vehicular emergency occurs.

10. A webbing lock apparatus according to claim 9, further comprising means for guiding the movement of said arm in the webbing wind-off direction.

11. A webbing lock apparatus according to claim 10, wherein said guide means includes a slot formed in said arm such as to extend in its longitudinal direction, and a pin projecting from said frame and received in said slot.

12. A webbing lock apparatus according to claim 11, wherein said arm has a toothed portion formed at said first end, said toothed portion being engageable with said gear wheel, whereby said gear wheel and said arm are engaged with each other when said acceleration sensor senses a high degree of acceleration.

13. A webbing lock apparatus according to claim 12, wherein said second end of said arm is formed in the shape of an L, and the L-shaped portion is retained by a pin projecting from said movable lock member, whereby said movable lock member is moved in a webbing clamping direction in accordance with the movement of said arm when a vehicular emergency occurs.

14. A webbing lock apparatus according to claim 13, wherein said acceleration sensor is constituted by an inertia weight which includes a head portion for swingably supporting said inertia weight, and said arm has a projection formed in the vicinity of said second end, said projection projecting toward said head portion, whereby, when said inertia weight swings on sensing a high degree of acceleration, said arm is pivoted about said pin on said frame through said projection, so that said arm and said gear wheel are engaged with each other.

15. A webbing lock apparatus according to claim 14, wherein said fixed and movable lock members have corrugated lock plates on their respective surfaces facing said webbing, whereby said webbing is reliably clamped when a vehicular emergency occurs.

16. A webbing lock apparatus according to claim 15, wherein said movable lock member is biased by biasing means in a direction in which said movable lock member comes away from said fixed lock member, whereby said movable lock member is away from said webbing when the vehicle is in a normal state.

17. A webbing lock apparatus according to claim 16, wherein said guide is secured to said frame and has an elongated groove for movably receiving a projection formed on said movable lock member, whereby said movable lock member is guided along said elongated groove.

18. A webbing lock apparatus according to claim 17, which is applied to a webbing retractor in a seatbelt system which linearly receives said webbing by the action of a pair of rollers.

19. A webbing lock apparatus for a seatbelt system designed to restrain an occupant during an emergency vehicular situation, comprising:
   (a) a frame mounted on the vehicle body;
   (b) a lock member attached to said frame for clampingly securing a seatbelt webbing when a vehicular emergency occurs;
   (c) a guide roller rotatably supported by said frame for supporting said seatbelt webbing;
   (d) a gear secured to said guide roller;
   (e) an arm having a first end that is engageable with said gear and a second end retained by a portion of said load member, said arm being movable in the webbbing wind-off direction;
   (f) guide means for guiding the movement of the arm in the webbing wind-off direction, wherein said guide means includes a slot formed in said arm along its longitudinal axis, a pin projecting from said frame and received in said slot, and
   (g) acceleration sensing means for sensing a high degree of acceleration at the time of a vehicular emergency and for causing said arm to engage with said gear when said high degree of acceleration is sensed,
whereby said webbing is reliably clamped when a vehicular emergency occurs.

* * * * *